March 3, 1936. H. P. MILLER, JR 2,032,588
COMMUNICATION AND DETECTION SYSTEM
Filed Sept. 12, 1931   7 Sheets-Sheet 1
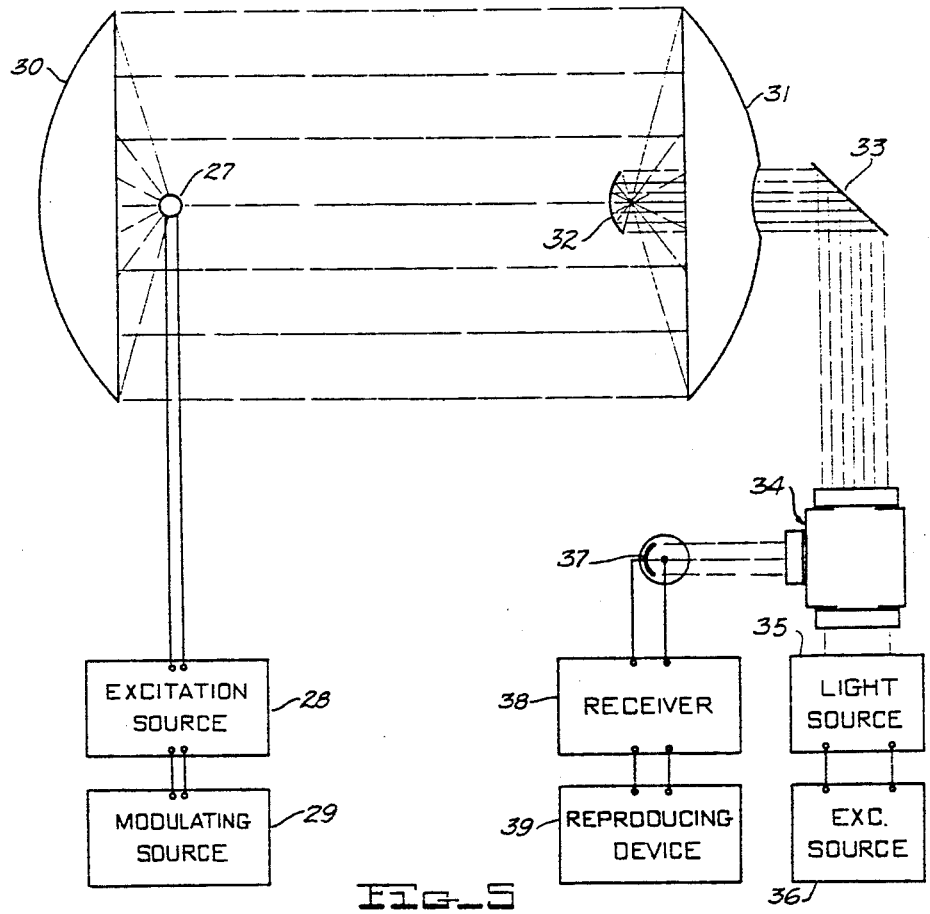
INVENTOR.
Herman Potts Miller, Jr.
BY
ATTORNEY March 3, 1936.  H. P. MILLER, JR  2,032,588
COMMUNICATION AND DETECTION SYSTEM
Filed Sept. 12, 1931  7 Sheets-Sheet 2
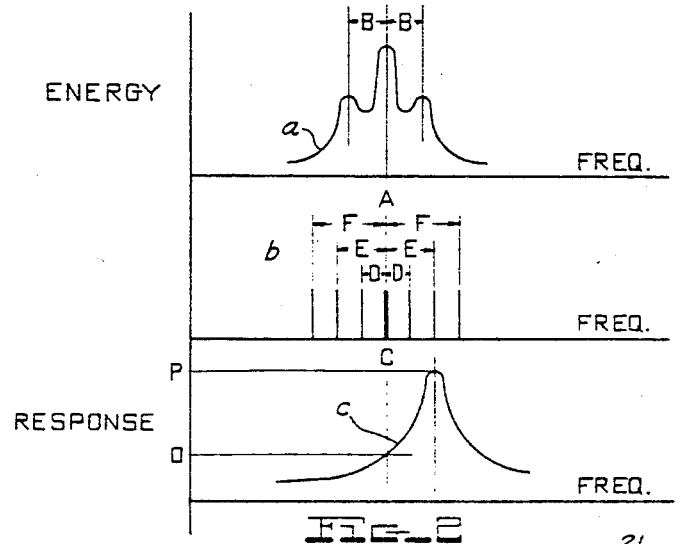
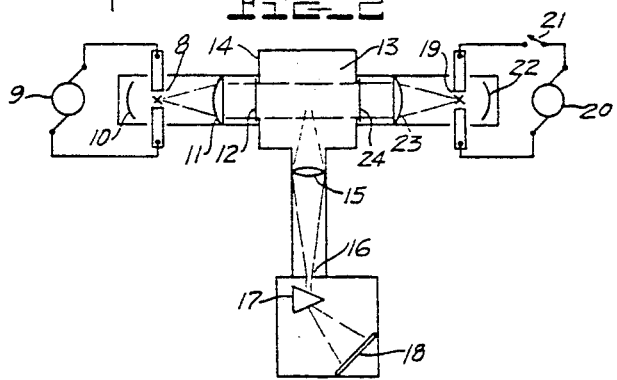
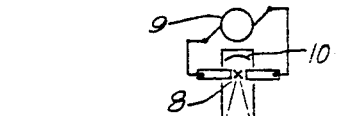
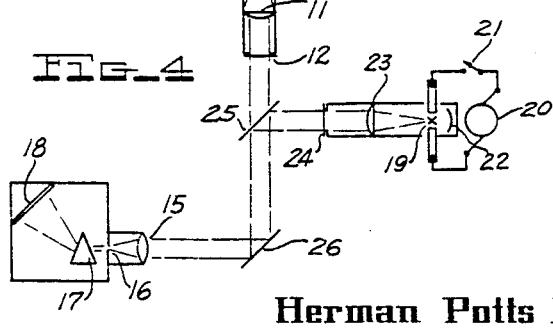
INVENTOR.
Herman Potts Miller, Jr.
BY
ATTORNEY

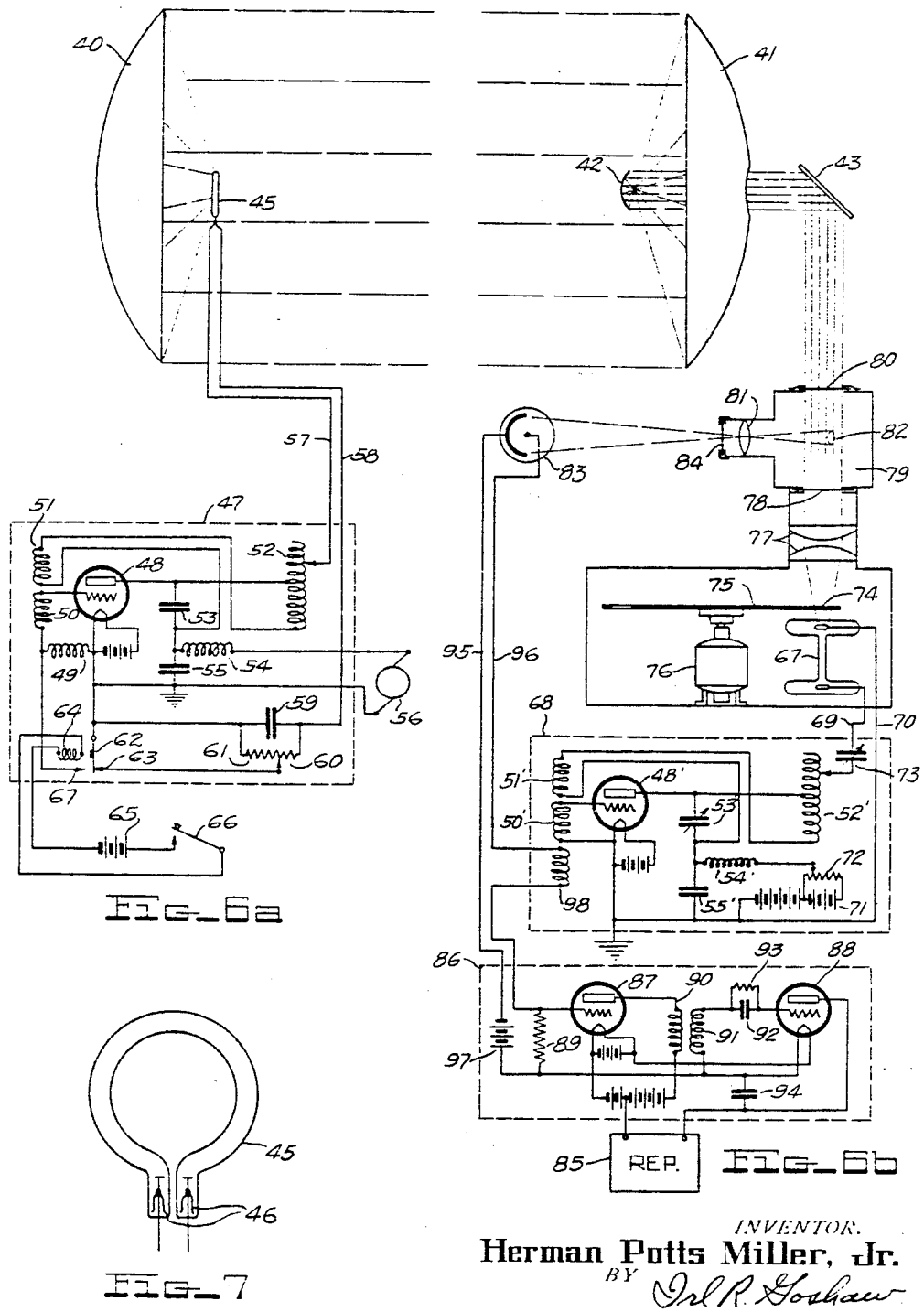

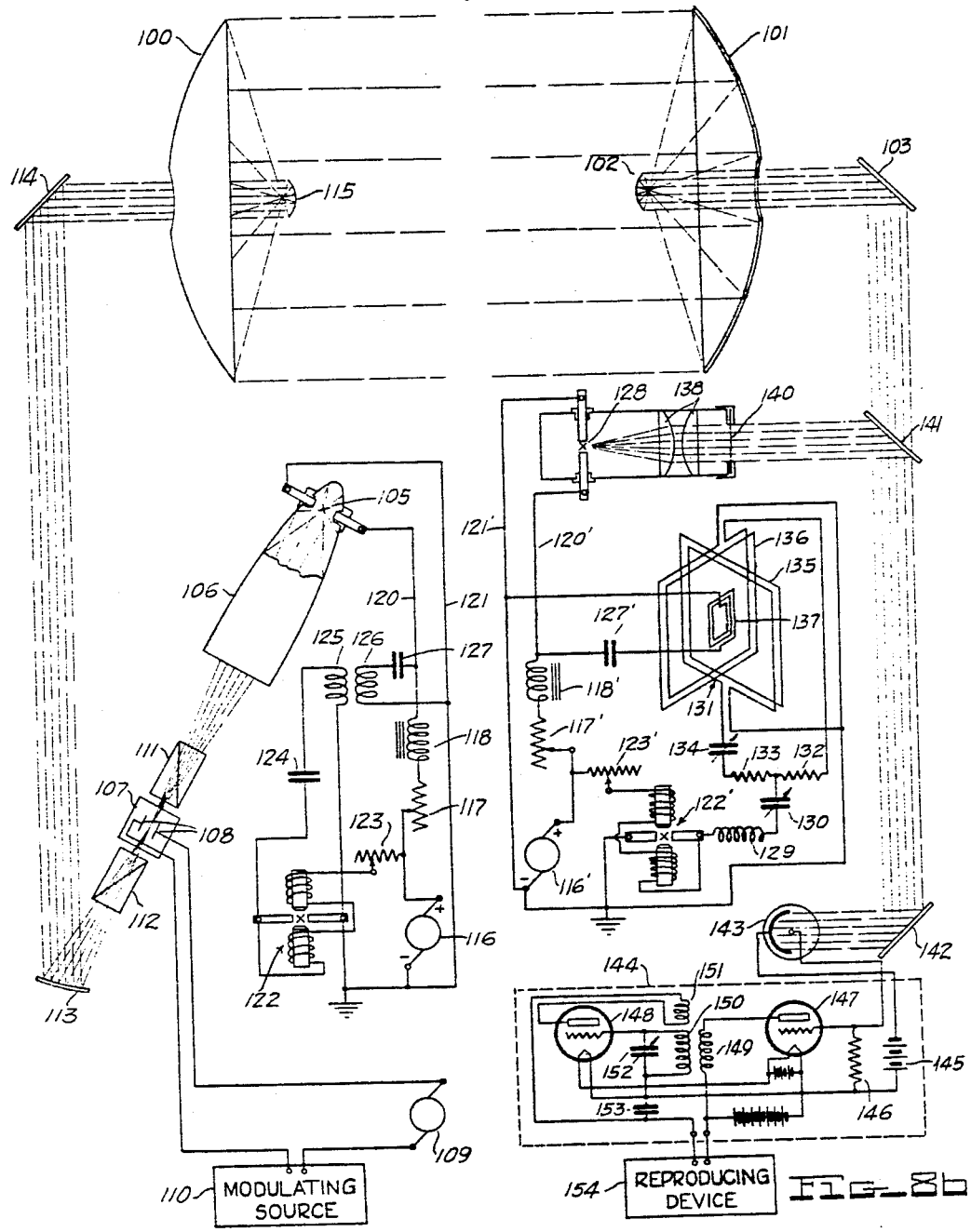

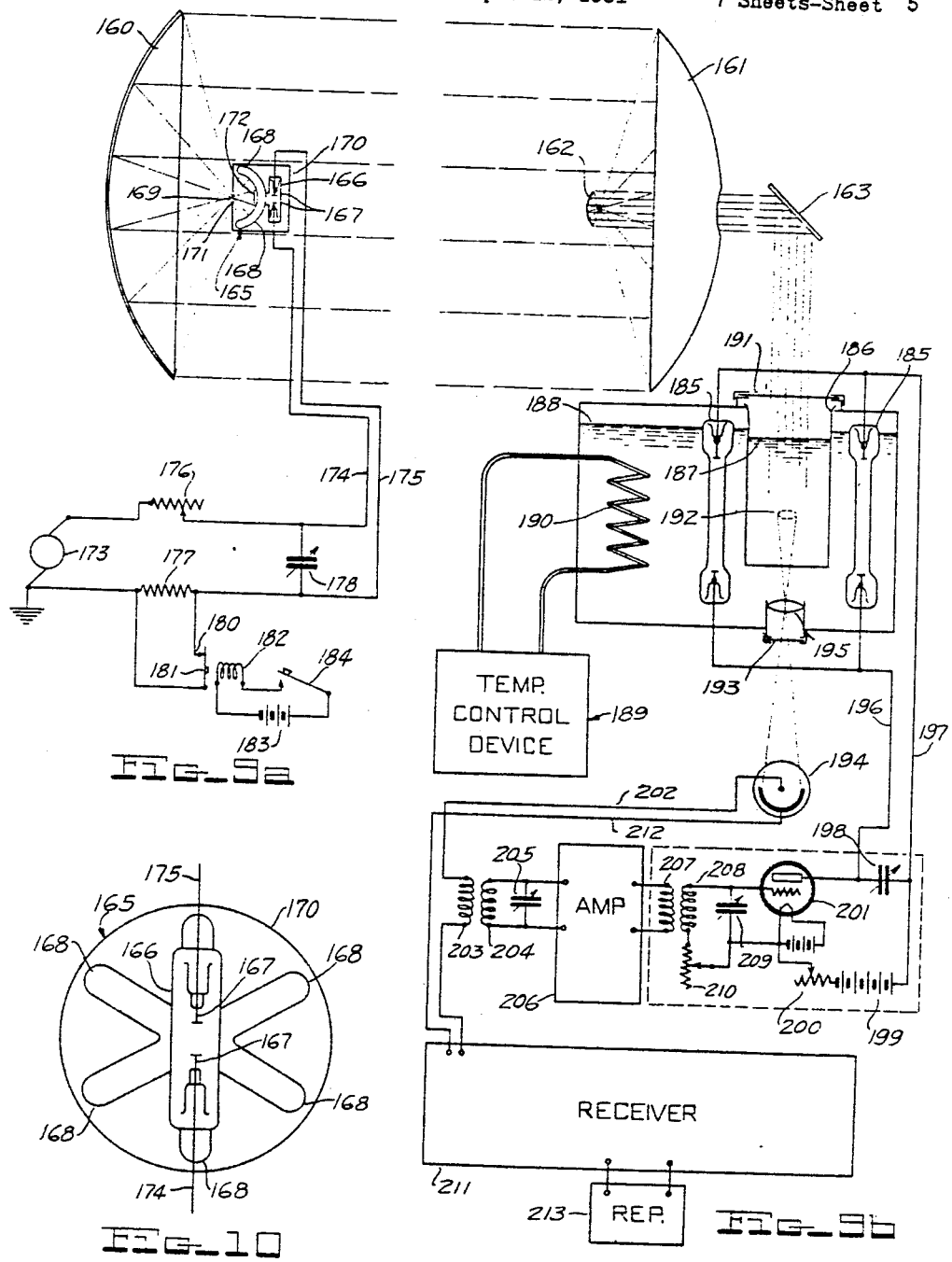
March 3, 1936.  H. P. MILLER, JR  2,032,588
COMMUNICATION AND DETECTION SYSTEM
Filed Sept. 12, 1931  7 Sheets-Sheet 5
INVENTOR.
Herman Potts Miller, Jr.
BY
ATTORNEY March 3, 1936.                H. P. MILLER, JR                    2,032,588
                      COMMUNICATION AND DETECTION SYSTEM
                          Filed Sept. 12, 1931           7 Sheets-Sheet 6
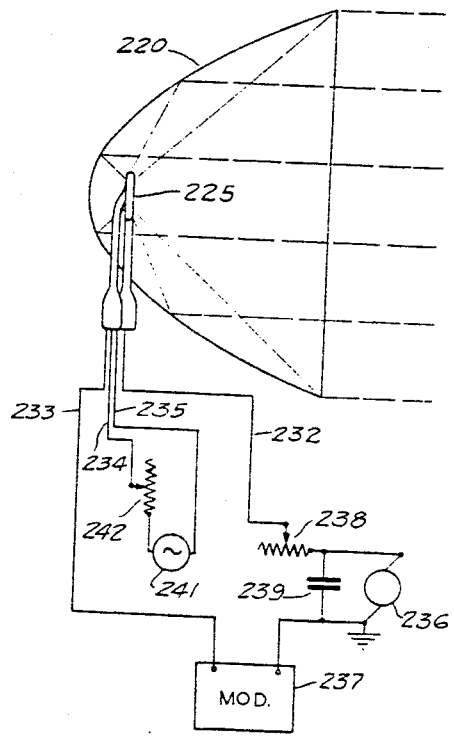
Fig_11a
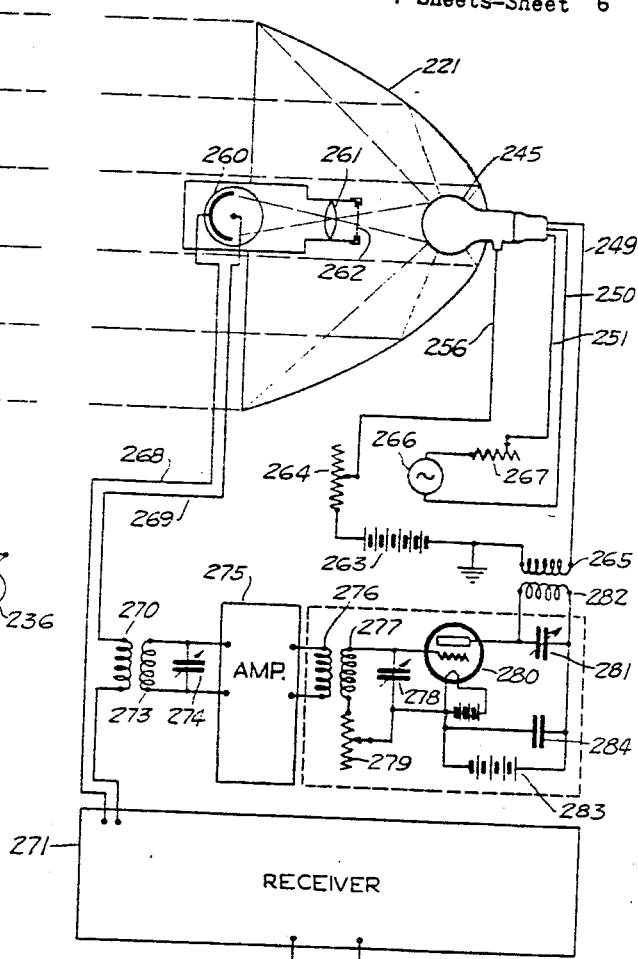
Fig_11b
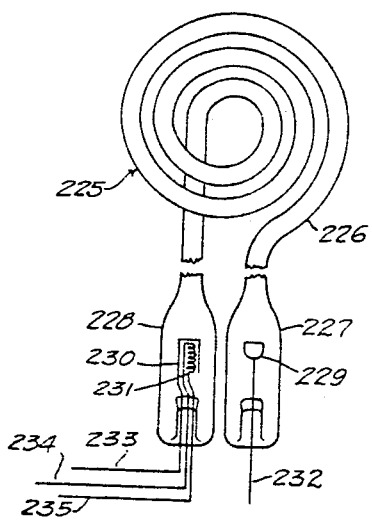
Fig_12
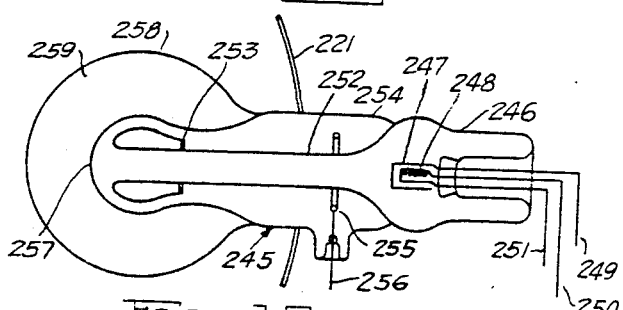
Fig_13
INVENTOR.
Herman Potts Miller, Jr.
BY
ATTORNEY March 3, 1936.　　　　H. P. MILLER, JR　　　　2,032,588
COMMUNICATION AND DETECTION SYSTEM
Filed Sept. 12, 1931　　　7 Sheets-Sheet 7
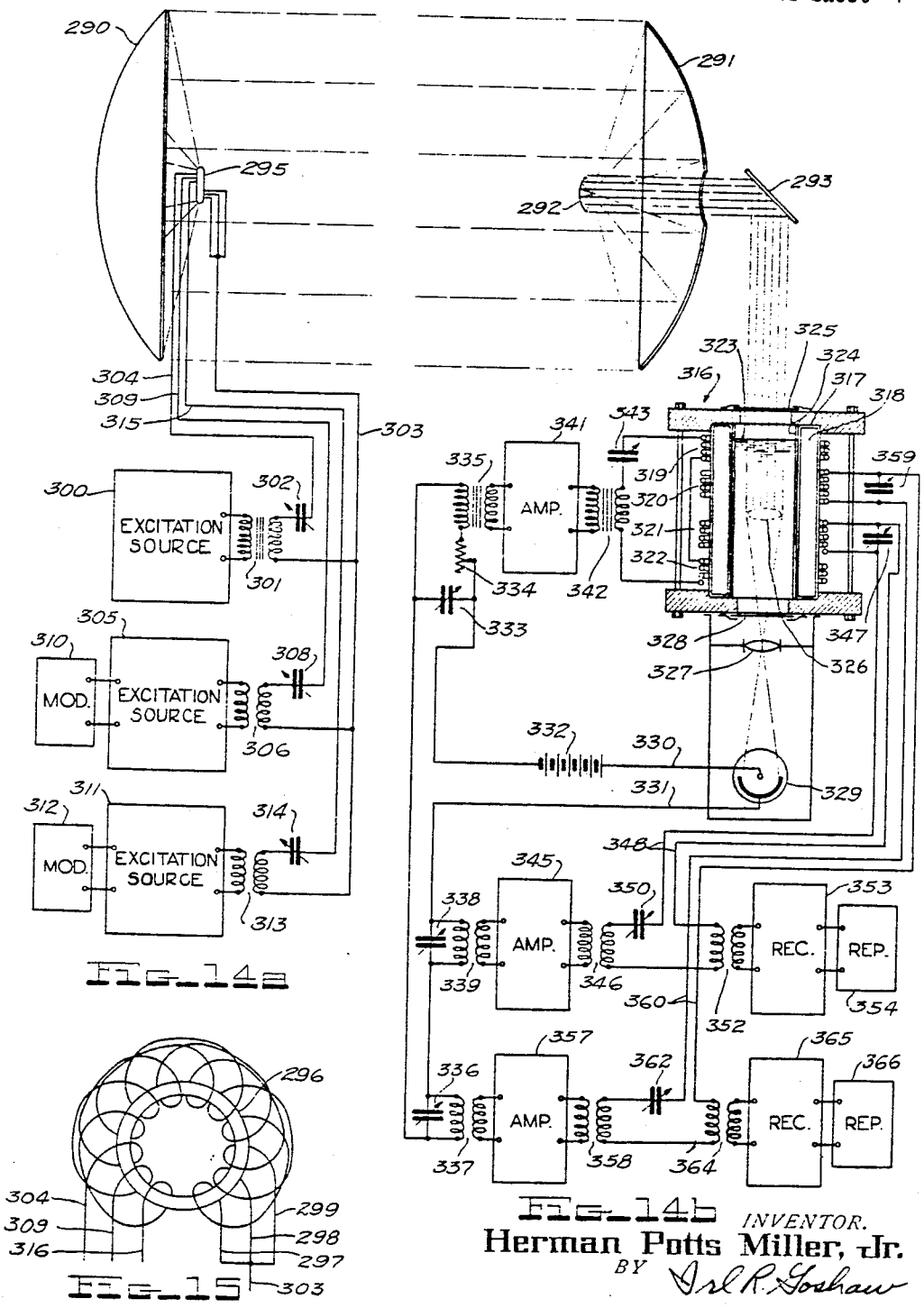
INVENTOR.
Herman Potts Miller, Jr.
BY Irl R. Goshaw
ATTORNEYS.

Patented Mar. 3, 1936

2,032,588

UNITED STATES PATENT OFFICE 2,032,588

COMMUNICATION AND DETECTION SYSTEM

Herman Potts Miller, Jr., East Orange, N. J.

Application September 12, 1931, Serial No. 562,590

33 Claims. (Cl. 250—7)

This invention relates to communication and detection systems and particularly to such systems utilizing extremely high frequency waves such as light and heat waves as the medium of transmission.

Light as a medium of communication between persons has been employed in various systems well known in the art such as the heliograph and other systems employing either visible or invisible light rays. Although the advantages of using certain light frequencies are many, the results obtained by the old methods have not been entirely successful because of inefficient detecting apparatus. The art of light signalling was neglected during the development of radio communication, but at present radio has failed to meet present day exigencies such as freedom from static, directional concentration, and the ability to replace direct vision. The present invention provides, therefore, a communication system having these desirable features, the system including transmitting and detecting apparatus in accordance with the disclosure hereinafter.

An object of this invention is to communicate between separated points utilizing wave radiations as the medium of transmission.

Another object of the invention is to communicate between separated positions utilizing wave radiations in the visible and invisible spectrums.

A further object of the invention is to accurately and efficiently detect the presence and determine the frequency of radiations projected by known and unknown sources.

The present invention particularly contemplates a method of and means for visibly detecting invisible light waves in both the infrared and ultra-violet spectrums. It utilizes the ability of certain radiated waves to penetrate moisture and dust laden atmospheres under all atmospheric conditions, the detection of these waves being a particular feature of the invention. In brief, the detection is accomplished by combining light waves from a source of any desired frequency with those from another source to form waves of an entirely different frequency and preferably of a frequency within the visible light range. In the heterodyne radio receiver it is well known how an incoming radio wave may be combined in a resonant circuit with a local radio frequency to produce a third frequency which may or may not be audible. In effect, the present invention discloses means for producing the same results with light waves.

A similar phenomenon has long been known in color photography conceived by Lippmann in which standing light waves produce laminæ in a sensitized film which, when developed and viewed in reflected light, produces the original colors. With this system, the combination of two light waves of different frequencies has resulted in a variation in intensity of the laminæ in the film in accordance with a third frequency, this frequency checking previous calculations.

My invention, however, combines two light frequencies to form a third frequency by employing the phenomenon known as "scattering with change in frequency". It is known in the art that when monochromatic light of a visible frequency is "scattered" by certain liquids or gases or reflected by crystalline substances and then observed with a spectroscope, it is possible to oberve lines representing frequencies other than that of the original light. This has been explained as being due to the change in size of the quanta given off by the light source. If the quanta give up some of their energy to atoms in the molecules of the "scattering" or reflecting medium, they are "scattered" with a lower frequency, while if they receive energy from the medium they are "scattered" with a higher frequency. The frequency differences between the incident light waves and the "scattered" light waves have been found equal to light frequencies which are in the infra-red spectrum.

In applying the principles mentioned above, the molecular atoms of the "scattering" medium are either energized or deenergized by invisible radiations. When light waves of another frequency are reflected by the same medium, a portion of these light waves are shifted to a third frequency and have an intensity which is dependent upon the degree of excitation of the medium by the invisible radiations. The shifted light waves may have a frequency in the visible spectrum and may be detected with well known light sensitive instruments. Shifted light waves which have been previously modulated may be detected in any well known manner such as by "heterodyning" or any radio detecting method.

Although a third frequency is obtainable by combining any two different light frequencies in accordance with the principles of my invention, more efficient combination may be effected by producing more in-phase components of the combining waves. It is well known in the art that light from incandescent solids and gases consists of discontinuous trains of waves the lengths of which depend on the time required for an electron in a light radiating atom to pass from one energy state to another, or approximately $10^{-8}$ seconds. With the energizing sources commonly used, these wave trains may start at irregular intervals so that the waves received at a given point may not all be in-phase. By exciting a light source with a radio frequency current, the period of which is comparable with the time required for an electron to pass from one energy state to another, or $10^{-8}$ seconds, more wave trains will be started in-phase and more efficient combination of two different light frequencies will be possible. Still greater efficiency may be obtained by the selection of the light frequencies in a manner to be described. Radio frequency currents with a period of $10^{-8}$ seconds, or a wave length of 3 meters, may be readily obtained either in the form of damped, undamped, or pulsating waves, or as harmonics from a radio frequency source of higher wave length.

This method of exciting the light sources permits the accomplishing of other results which are disclosed hereinafter, among which are the modulation of the invisible radiations in any well known manner and the making of such modulations readily understandable at the receiving point.

The novel features that I consider characteristic of my invention are set forth with particularity in the appended claims. The invention itself, however, both as to its organization and its method of operation, together with additional objects and advantages thereof, will best be understood from the following description of certain specific embodiments, when read in connection with the accompanying drawings in which like reference characters represent like elements and in which:

Fig. 1 is a frequency and wave length chart of the waves utilized in my invention; Fig. 2 shows curves illustrating the principle of "scattering with change in frequency"; Figs. 3 and 4 show schematically two methods by which "scattering with change in frequency" can be obtained; and Fig. 5 shows diagrammatically the elements used in my invention for a light communication system.

Figs. 6a and 6b are schematic drawings of a transmitter and receiver, respectively, for a communication system in accordance with my invention; and Fig. 7 is an elevation of the light source used in the transmitter of Fig. 6a.

Figs. 8a and 8b are schematic drawings of a transmitter and receiver, respectively, of another embodiment of my invention.

Figs. 9a and 9b are schematic drawings of a transmitter and receiver, respectively, in accordance with the principles of my invention and having temperature control for the receiver "scattering" medium; and Fig. 10 is an elevation of the particular light source used in the transmitter of Fig. 9a.

Figs. 11a and 11b are schematic drawings of a communication system embodying the principles of my invention and having self oscillating light sources; Fig. 12 is an elevation of the light source used in the transmitter of Fig. 11a; and Fig. 13 is an enlarged section of the light source used in the receiver of Fig. 11b.

Figs. 14a and 14b are schematic drawings of a transmitter and receiver, respectively, for a communication system providing a plurality of communication channels according to another embodiment of my invention; and Fig. 15 is an elevation of the light source used in the transmitter of Fig. 14a.

Referring to Fig. 1, a frequency and wave length chart shows the range of radiations which may be used for communication purposes including those employed in accordance with my invention. The radio range has been considered to lie between $1.3 \times 10^4$ and $8.6 \times 10^{11}$ cycles per second; the infra-red between $8.6 \times 10^{11}$ and $4.0 \times 10^{14}$ cycles per second; and the visible spectrum between $4.0 \times 10^{14}$ and $7.9 \times 10^{14}$ cycles per second. The following description discloses methods of and means for utilizing all light frequencies, both visible and invisible, for communication purposes. However, the following disclosure describes particularly communication systems employing invisible frequencies, such as infra-red, for transmission purposes since visible and the higher frequencies shown on the chart are readily absorbed by material objects.

Reviewing the method of modulation employed for radio transmission and reception, it is well known that the energy radiated from a radio telephone transmitting station operating on a frequency A varies with frequency in the manner shown by curve "$a$" in Fig. 2, in which A is the carrier frequency and B a modulating frequency causing two peaks at $A+B$ and $A-B$. With A a radio frequency and B an audio frequency, the beat frequencies will be radio frequencies, but if B is also a radio frequency of nearly the same value as A one of the beat frequencies will be audible as in the heterodyne receiver.

A phenomenon similar to modulation has been observed with light waves using a portion of the apparatus shown in Fig. 3 in which 8 is an arc light energized by an energy source 9, but which may be any suitable type of source of wave energy in the visible or ultra-violet regions. Light from arc 8 is collected by a reflector 10 and passed through a condensing lens 11 from which it proceeds in a parallel beam through a light filter 12 into a liquid or gas or combinations of different liquids or of different gases 13 capable of causing "scattering with change in frequency", such "scattering" being obtained with benzene, carbon tetrachloride, carbon dioxide, or the like. The "scattering" medium 13 may be maintained at any suitable temperature and pressure. The filter 12 may be comprised of one or more of the well-known forms of liquid cell, glass, or gelatin filters, or combinations thereof, selected in a manner to be described hereinafter to permit light of practically one frequency to pass into the medium 13. A container 14 for the medium 13 has attached to a face at right angles to the axis of the light beam from light 8 an extension containing a lens 15 which focuses a spot in the medium 13 on a slit 16 of a spectrometer containing a dispersing prism 17 and a photographic plate 18. A second arc light 19 which may be any suitable type of source of radiations that will excite to vibration the molecular atoms in the medium 13, and which is energized by an energy source 20 through a switch 21, is supported on an extension to the container 14 and in line with the light beam from arc light 8. Light from 19 is collected by a reflector 22 and brought to a parallel beam, which is coaxial with the beam from light 8, by condensing lens 23 before passing through a light filter 24 into the medium 13. The reflector 22 may be of copper, zinc, or some material that will readily reflect the radiations employed from arc light 19, but will reflect with low efficiency light of the frequency passed by the filter 12. The lens 23 may be of glass, quartz, fluorite, rock salt, sylvite or any other material capable of passing the employed radiations from light 19, while filter 24 may be a combination of one or more of these substances with one or more substances that will also absorb radiations of the frequency passed by the filter 12. The absorbing substances may comprise liquid or gelatin films or coloring matter for the non-absorbing substances mentioned above. A specific selection for a practical application is given hereinbelow.

In Fig. 4 a similar system is shown, elements similar to those in Fig. 3 being given like reference characters. In this system, however, the two light beams from lights 8 and 19 are not directed toward each other but are superimposed by means of a filter-reflector 25 which is of a material that will readily pass the visible light from light 8, but will reflect the invisible light from light 19. Reflectors of this type can be obtained in certain kinds of colored filter and heat transmitting glasses, it generally being the case that a glass giving a low transmission at a particular light frequency is a good reflector at that frequency. The superimposed light beams are directed toward a crystalline plate 26 which may be of any substance capable of causing "scattering with change in frequency", such as quartz and the like. The plate 26 then reflects the beams of shifted frequency into the lens 15. In this particular system the effect of "scattering with change in frequency" may be a more coherent reflection than is obtained with that shown in Fig. 3.

This phenomenon has been observed with the use of the apparatus of Figs. 3 and 4 without the aid of the light 19, the filter-reflector 25, and the elements associated therewith, the latter elements and their use being a feature of my invention. The phenomenon which has been obtained with the former apparatus is a spectroscopic image on plate 18 of the form shown at "b" in Fig. 2. This image contains one line C for the wave frequency of the light from arc 8 and six additional lines at frequencies $C+D$, $C-D$, $C+E$, $C-E$, $C+F$, and $C-F$. These six lines indicate the same effect as the modulation of frequency C by frequencies D, E, and F. The frequency differences D, E, and F have been found to vary with the "scattering" medium used.

The explanation given for "scattering with change in frequency" is that some of the light quanta from arc 8, in Figs. 3 and 4 for instance, have their energy content changed by collision with molecules of the medium 13 or of the crystalline plate 26 and either give up or receive a small amount of energy from the atoms in these molecules. Since the energy in a light quantum is given by the expression $hv$, where $h$ is a constant and $v$ is the frequency, a change in energy must be accompanied by a change in frequency. If energy is given up, the frequency will be decreased and if energy is received, the frequency will be increased. Since the energy changes occur in fixed amounts one way or the other, the frequency shifts above or below the original frequency C occur in pairs as shown in "b" of Fig. 2. These frequency shifts are usually small so that if the original frequency lies within the visible spectrum the shifted frequencies will also be visible, and the frequency shifts being small, are of the order of magnitude of the frequencies found in the infra-red spectrum. (See Fig. 1.) The general effect is, therefore, that of modulation of a visible frequency by an infra-red frequency. It is also found that small frequency shifts are easier to obtain than larger ones, this being a very desirable feature since the low infra-red frequencies are at the present time least understood and harder to use for communication purposes while the higher frequencies have been used to a limited extent.

Another phenomenon observed is that it is easier to obtain spectrum photographs showing shifts to lower frequencies than to higher ones. This is explained by the theory that light quanta of the original frequency give up some of their energy to the atoms in the "scattering" or reflecting medium more readily than they receive energy. In order for these light quanta to receive energy from the atoms, it is necessary for the atoms to be set in vibration by some other means. This has been done by heating the "scattering" or reflecting medium and has caused increased intensities of the shifted light waves of higher frequencies. Since heat waves lie in the infra-red spectrum, the projection of infra-red waves on the medium produces the same effect as heating.

My method of and means for setting up vibrations in the "scattering" mediums 13 and 26 in Figs. 3 and 4 is the arc light 19 and the elements associated therewith. The light beam from this arc is of such a frequency that it sets up vibrations in the atoms of the "scattering" medium with the result that the intensity of one of the lines in the spectrum photograph, such as the $C+E$ line at "b" in Fig. 2, is considerably increased. Interrupting the energization of the arc light 19 by opening and closing the switch 21 will cause corresponding changes in the intensity of the $C+E$ line. By also inserting between lens 15 and aperture 16 a light filter of the same general type as filter 12 which will pass only light of frequency $C+E$, the variation in intensity of the $C+E$ line due to the manipulation of switch 21 will be more readily observed.

The use of "scattering with change in frequency" for the detection of invisible radiations is not to be confused with methods employing the well-known phenomena of fluorescence and phosphorescence. A medium exhibiting these phenomena is characterized by its ability to absorb light over a band of frequencies in the ultra-violet spectrum and in the ultra-violet end of the visible spectrum. A frequency within this absorption band causes the medium to fluoresce and emit light over a broad band of still lower frequencies than those in the absorption band. Since the fluorescent band is usually within the visible spectrum, this phenomenon permits the visible detection of invisible ultra-violet frequencies without the use of a third source of light frequencies. Phosphorescence may be employed for the detection of infra-red frequencies through the quenching action of such frequencies. In this case a local source of light vibrations of frequency C may cause a medium to phosphoresce over a relatively broad band of lower frequency, such as $C-D$ to $C-F$, and the infra-red vibrations are merely employed to stop phosphorescence. In my invention the "scattering" medium may not have the absorption band characteristic of fluorescent mediums and the light of shifted frequency may be monochromatic light of a higher frequency, such as $C+E$. The variation in intensity will vary directly with the intensity of the infra-red vibrations and not inversely as in the case of phosphorescence.

The systems of Figs. 3 and 4 also permit measuring the frequency of invisible radiations, such as from the arc light 19. If the filter 24 is selected so that it will pass all radiations below the frequency passed by the filter 12, radiations of a number of frequencies from the light 19 will strike the medium 13 or 26. This may result in a change in the intensity of some of the shifted lines on photographic plate 18. For example, the $C+D$ and $C+F$ lines in "b" of Fig. 2 may have greater intensity than they would if light 19 were not used. This would indicate that the light 19 emits radiations corresponding to the frequency shifts D and F. Since the frequency C from light 8 can be accurately measured, the frequencies of the radiations from light 19 may be determined from the image on the photographic plate 18. In the same manner, other radiations from light 19 may be measured by using a "scattering" medium which causes other frequency shifts. The amount of change in the intensities of the lines on the plate 18 will also indicate the intensity of the radiations being measured.

Referring to Fig. 5, the general manner in which the above described principles are applied for communication purposes in my invention is shown schematically. In this drawing a transmitting light source 27 is capable of radiating one or more infra-red or invisible waves of a frequency that will readily pass through a fog or dust laden atmosphere. This light source is energized to the desired intensity with any suitable form of energy, such as an alternating, direct, or pulsating current from an excitation source 28. The intensity of the excitation applied to the light source 27 by the exciting source 28 may be controlled in accordance with a modulating source 29, which may be a telegraph key, sound waves, television signals, or any other source of modulations of a like nature.

Radiations from the light source 27 are collected by transmitting reflector 30 which is of a suitable material and form to efficiently direct the radiations to a receiving reflector 31 of the same or of a different material and form, preferably, however, of the paraboloidal type. It is to be understood that reflectors are employed to increase the efficiency of the system, but may be dispensed with in some cases. After being intercepted by the reflector 31, the radiations are again collected and brought to a small parallel beam with a small reflector 32, which may be of the same material and form as the reflector 31 or may be of a material, such as copper or zinc, which will readily reflect the infra-red or invisible waves from the source 27, but will reflect very poorly any visible waves from sources close to the reflector 31. The rays are then directed through an opening in reflector 31 to a plane reflecting mirror 33 of the same or of a different material from reflector 32 which is placed at an angle suitable for directing the small parallel beam towards one face of a container 34 containing a medium capable of producing "scattering with change in frequency". A second or local light source 35, preferably of the same general type and form as the light 27, is energized by an exciting source 36, which may be of the same type as source 28, producing a light beam of visible or near visible frequency which is directed towards another face of the container 34. A light sensitive cell 37 of a type giving maximum response at a shifted light frequency, such as $C+E$, is placed with reference to container 34 so that it receives the maximum effect of the light waves of frequency $C+E$. The variations in current through the cell 37 are impressed on a suitable receiver 38 arranged to function with the type of variations received, whether they be direct current impulses, modulations of a high frequency carrier wave, or radio telegraph signals, and which changes these variations to a form that can be readily heard or observed through the medium of a reproducing device 39. The device 39 may be a telephone receiver, loud speaker, automatic recording device, television system or any similar device or system.

In the operation of the system of Fig. 5 signals of whatever form desired are impressed by the modulating source 29 on the excitation source 28 and cause intensity variations in the infra-red radiations emitted by the light source 27. Whenever these infra-red signals strike the medium in container 34 and excite some atoms in it, light waves of frequency C from the visible light source 35 are shifted to a higher frequency $C+E$. The intensity of the shifted light falling on the light sensitive cell 37, therefore, varies in accordance with the signals from the modulating source 29. The light sensitive cell 37 may have a frequency response corresponding to curve "c" in Fig. 2, in which case light of frequency $C+E$ gives maximum response while the original light frequency C gives little response. Any other shifted frequencies will be too weak to have any appreciable effect. The response of cell 37 will then vary between a value O on curve "c" when there is no infra-red signal and a value P when the infra-red signal is maximum. This variation may be amplified and detected in the receiver 38 and interpreted with the reproducing device 39. For maximum response in cell 37 it is desirable that the excitation sources 28 and 36 be adjusted, by means described hereinafter, so that the two light beams striking the "scattering" medium in the container 34 cooperate efficiently. To obtain two-way communication it is only necessary to associate two one-way systems, or use the same apparatus but employ two different transmitting frequencies.

The general principles of the invention and their general application have been described above and I now refer to specific preferred embodiments each of which has its particular advantages as will be set forth hereinafter.

In Figs. 6a and 6b, a complete light wave communication system is illustrated in which the light sources are excited with alternating currents, Fig. 6a being the transmitter and Fig. 6b the receiving equipment. The reflectors, or radiation projectors, and optical system are similar to those in Fig. 5, reflectors 40, 41, 42, and 43 corresponding to reflectors 30, 31, 32, and 33 of Fig. 5 and operating in a similar manner. A transmitting light source 45 of the gas discharge type containing a gas such as neon, helium, or mercury vapor, is positioned at the focus of reflector 40, the reflector being constructed to project a parallel beam from such a source. This light source is shown in annular form and may have a gas pressure giving a long positive column but may vary in these respects, the prime requisite being the concentration of a maximum wave radiation toward the receiver with a given amount of input energy. The side elevation of light source 45 is shown in Fig. 7, electrodes 46 of copper, aluminum, or similar material being located at the lower extensions of the annular tube of optical or heat transmitting glass, quartz, or any suitable material which is transparent to the radiations to be employed.

The excitation source for light 45 shown schematically at 47 in Fig. 6a is of a well known type of feed-back oscillator comprising a vacuum tube 48, grid choke coil 49, grid inductor 50, feed-back inductor 51, plate circuit inductor 52, plate circuit condenser 53, choke coil 54, and by-pass condenser 55. A source of direct current potential 56 supplies the vacuum tube 48 with anode voltage as well as energy to maintain light source 45 at minimum intensity when the circuit 47 is not oscillating. The light source 45 is connected to the excitation source 47 over conductors 57 and 58.

In series with conductor 58 is a condenser 59 of low reactance. In parallel with condenser 59 is a suitable potentiometer comprising the variable resistance arms 60 and 61, arm 60 being capable of adjusting the direct current flowing through the light 45 when the circuit is not oscillating, and arm 61 together with arm 60 being capable of suitably adjusting the direct current through the light 45 when the circuit is oscillating. The total resistance of arms 60 and 61 may be large in comparison with the reactance of condenser 59 at the oscillating frequency. Arm 61 is also connected between a moving arm 62 and a back contact 63 of a relay 64. The relay 64 is energized from an energy source 65 through a suitable signalling device 66 which is shown as a telegraph key but may be any style of manually or automatically operated make and break device. A front contact 67 and the arm 62 of the relay 64 are connected to the ends of the grid choke coil 49.

In the operation of the transmitter shown in Fig. 6a, the closing of the signalling device 66 operates relay 64 and brings arm 62 in contact with contact 67. This shorts the grid choke coil 49 and permits the circuit to oscillate at a suitable frequency. An alternating current then passes through feed-back inductor 51, plate circuit inductor 52, conductor 57, light source 45, conductor 58, condenser 59, and condenser 55. The value of this alternating current may be adjusted by means of the tapping connection between conductor 57 and inductor 52 to a value that will give light radiations of the frequency and intensity desired. A small direct current also passes from the energy source 56 through choke coil 54, feed-back inductor 51, plate circuit inductor 52, conductor 57, light source 45, conductor 58, and resistors 60 and 61. While this direct current may have any desired value, it is preferably small in comparison with the alternating current through the light source 45. When signalling device 66 is opened, relay 64 is de-energized and the short across choke coil 49 removed so that the circuit does not oscillate and no alternating current flows through the light source 45. At the same time relay arm 62 touches contact 63 and shorts the resistor 61 permitting the direct current through the light 45 to be adjusted by the resistor 60 to the value that will just maintain the discharge in light 45. This keeps the gas in light 45 in an excited condition at all times, thus accelerating its illumination when the oscillations are started and stabilizing the load on the oscillator. The light waves given off by the light 45 during the non-oscillating periods are of such low intensities and have such irregular wave trains as to cause little effect on the distant receiving apparatus. The usable light waves sent out by the transmitting system will, therefore, vary in intensity in accordance with the operation of the signalling device 66.

In the receiving system of Fig. 6b, a local light source 67 is a spectrum tube of the H type but may be any form of discharge tube capable of providing a concentrated source of light of the desired intensity and frequency. This source 67 may be energized by any suitable source of alternating current of the desired frequency, such as a feed-back type of vacuum tube oscillator 68 acting through conductors 69 and 70. The oscillator 68 is similar in most respects to the oscillator 47 in Fig. 6a and the elements in 68 which are similar to those in 47 have been given like reference characters with prime indicators. A source of direct current potential 71 supplies the vacuum tube 48' with anode voltage which may be varied over the desired range by means of a suitable potentiometer 72. In conductor 69 is a condenser 73 suitable for adjusting the phase of the current through the light source 67.

Light from the source 67 passes through a plurality of holes 74 in a disk 75, the holes 74 being spaced so that, when the disk 75 is rotated at a suitable speed by a prime mover 76, the light from source 67 is interrupted at an audible frequency. After passing through the holes 74, the light from source 67 is brought to a parallel beam by condensing lenses 77 before passing through a light filter 78 which admits only light of the desired frequency into a "scattering" medium 79. The medium 79 may be a solid, liquid, or gas capable of causing "scattering with change in frequency" and maintained at suitable temperature and pressure. Radiations from the transmitting source 45 of Fig. 6a are reflected by the reflector 43 through a light filter 80 into the medium 79 in the manner described hereinabove. The light filter 80 passes only one or more invisible radiations of the frequencies which it is desired to use.

A lens 81 focuses a spot 82, of suitable size and position in the medium 79 to give the maximum amount of light of shifted frequency, onto a light sensitive cell 83 through a light filter 84. The light filter 84 may be capable of passing light of the shifted frequency without passing any light from the beams entering the medium 79 through the filters 78 and 80.

Specifically the tube 67 may contain helium gas giving a strong radiation at 0.5876 micron. The filter 78 may then be an orange filter glass which will not transmit any of the visible radiations from source 67 below 0.5876 micron. The radiations utilized in the transmitting source 45 may have a wave length of approximately 3 microns, such as may be obtained from a strontium arc. The reflectors 42 and 43 may then be of zinc and the filter 80 of quartz thus permitting radiations of 3 microns to enter the "scattering" medium 79 without permitting visible radiations to enter. Another possible arrangement is to use a red heat transmitting glass for the filter 80. Such a filter transmits radiations of 3 microns but does not transmit radiations below 0.7 micron.

The "scattering" medium 79 may consist of a substance such as phenol, dipentene, dimethylaniline, or any substance giving the necessary frequency shift E. Using phenol the shifted frequency $C+E$ would have a wave length of 0.4981 micron. The filter 84 may, therefore, consist of a suitable didymium filter glass together with a glass filter cell 2 centimeters thick containing a 5% solution of copper acetate in water. The didymium filter readily transmits radiations at 0.4981 micron but not at 0.5876 micron while the copper acetate solution absorbs radiations above 0.6 micron. The radiations falling on the photoelectric cell 83 will have a wave length in the neighborhood of 0.5 micron. This cell may, therefore, employ a photo-emissive surface of strontium, barium, or rubidium. Combinations of other similar elements will be readily apparent to those skilled in the art.

Current variations through the cell 83 are made to operate a reproducing device 85 by means of a suitable receiver, such as the well known non-oscillating type of radio receiver shown schematically at 86. This receiver comprises vacuum tubes 87 and 88, input resistor 89, plate circuit inductor 90, grid circuit inductor 91, grid condenser 92, grid leak resistor 93, and by-pass condenser 94. The receiver is connected to cell 83 through conductors 95 and 96. In conductor 95 is a source of direct current potential 97 for the cell 83 while in conductor 96 is an inductor 98 suitable for introducing an alternating potential from the output circuit of the cell 83 into the grid inductor 50' of the oscillator 68.

In the operation of the receiving system shown in Fig. 6b, the oscillator 68 may be tuned by means of condenser 53' to the same frequency as the oscillator 47 of Fig. 6a and the intensity of light from source 67 adjusted by varying the anode potential of tube 48' with the potentiometer 72. It will be realized, however, that since the oscillators 47 and 68 modulate the light beams from sources 45 and 67 at an alternating frequency which may lie in the radio spectrum, in order to obtain a maximum response from the cell 83 it is desirable to have the modulated light waves arrive at the "scattering" medium 79 with the modulations in-phase. The two sources 45 and 67 may necessarily be located at different distances from the medium 79 so that for maximum response the phase difference between the alternating currents in the lights 45 and 67 may have to be adjusted to produce this in-phase relationship in the medium 79. Since the gas discharge in the light 67 acts as a pure resistance, the necessary phase adjustment may be obtained with the variable condenser 73 and the variable tapping connection between condenser 73 and the plate inductor 52'.

Another desirable adjustment is to make the oscillation frequency of the circuits 47 and 68 of such a value as to encourage the emission of trains of light waves from the light sources 45 and 67 at periodic intervals which are preferably multiples of the periods of the light waves being used. With direct current excitation of the light sources 45 and 67, the wave trains would be emitted at irregular intervals and the phase of the waves reaching a given point would, therefore, be constantly changing. By exciting the sources with alternating currents, more of the wave trains will start out when the currents are at their maximum points and hence more of the waves will reach a given point in-phase. In order, however, for this effect to be most noticeable, the frequency of the alternating currents should be higher than those ordinarily used and preferably comparable with the frequency at which an electron in a light radiating atom can periodically change back and forth between two energy states. It is known that such an electron can pass from one energy state to another in approximately $10^{-8}$ seconds so that the total time required for an electron to make a complete change would be approximately $2 \times 10^{-8}$ seconds, corresponding to a frequency of $5 \times 10^7$ cycles per second, or a wavelength of 6 meters. The exciting sources should, therefore, preferably deliver electrical impulses to the light sources at the rate of approximately $5 \times 10^7$ impulses per second. With the rate of excitation a multiple of the light frequency, there is less chance for a change in phase between successive wave trains and hence more of the light waves from each light source arrive at one point in-phase. When the two light sources 45 and 67 are excited at the same frequency, in order for the rate of excitation to be a multiple of the light frequency for both sources it would be necessary for the frequency of one light wave to be a multiple of the other. It should be noted, however, that the above described frequency adjustment merely serves to increase the efficiency of the communication system of Figs. 6a and 6b and is not a requirement for its proper functioning.

It is also desirable in this embodiment of my invention to maintain the same phase relationship between the currents in the two light sources 45 and 67 while signalling. The oscillating circuit 68 functions without interruptions while the oscillations in circuit 47 are started and stopped in accordance with the signalling device 66. Without some special control means there is no assurance that their phase relationship will remain fixed. In order to maintain this phase relationship, the coupling between grid inductor 50' and feed-back inductor 51' is adjusted to a value that will permit feeble oscillations. These oscillations are just sufficient to cause light from source 67 to be "scattered" by the incoming radiations from light 45, even though the two light modulations may not be in-phase in the medium 79. The light of shifted frequency in the medium 79 causes a small alternating current to flow through the cell 83, conductor 95, potential source 97, resistor 89, inductor 98, and conductor 96. This current through inductor 98 induces a controlling voltage in the grid inductor 50' which may be out of phase with the small feed-back voltage induced in inductor 50' by the current in inductor 51'. The controlling voltage quickly pulls the feedback voltage into phase with it and the two voltages combine to give stronger oscillations in the circuit 68. This increases the excitation of the light 67 and, up to a certain point, the current through the cell 83, the controlling and feed-back voltages on tubes 48', and the alternating current in the circuit 68. This feed-back effect from the oscillator back through the light 67 and the cell 83 will also tend to maintain the same frequency of oscillation in the circuit 68 as in the circuit 47. In other words, I utilize the principle that causes two oscillators at approximately the same frequency to pull into step.

The rotating disk 75 with its holes 74 interrupts the light beam from light 67 so that with a continuous dash signal coming in from light 45 the intensity of the light of shifted frequency will vary at a frequency determined by the frequency of interruption of the light from source 67. The light cell 83, therefore, has three variations in the intensity of the light impressed upon it: an alternating frequency due to the oscillators 47 and 68, an audio frequency due to the rotating disk 75, and a signalling variation due to the signalling device 66. These variations cause a current to flow from the cell 83 through conductor 95, potential source 97, resistor 89, inductor 98, and conductor 96. The variations in this current are impressed upon the grid of the tube 87 by the voltage drop in resistor 89, are amplified by the tube 87 and its associated elements and rectified by the tube 88 and its associated elements in the well known manner. Because of the audio frequency variations, the signals impressed on the reproducing device 85 will be audible signals in accordance with the signals sent out from the transmitting system.

In Figs. 8a and 8b is shown another complete light wave communication system in which the light sources are located at a distance from the reflector system and are excited with pulsating currents, Fig. 8a being the transmitter and Fig. 8b the receiving equipment. In this system the reflectors 100, 101, 102, and 103 are similar to and operate in a manner similar to reflectors 30, 31, 32, and 33 of Fig. 5. For the transmitting light source an arc light 105 is shown in Fig. 8a, but any form of light may be used that will give the desired light intensity from an alternating current modulated direct current energy source. With an arc of the type shown the radiations obtained will depend on the material of the electrodes employed. By means of an ellipsoidal reflector 106, the light beam from light 105 is brought to a focus at the center of a Kerr cell 107. The cell 107 is capable of rotating the plane of polarization of the light beam from 105 when a suitable potential is applied across electrodes 108 from a direct current energy source 109 in accordance with the control effected by a modulating source 110. Along the axis of the light beam from light 105 and on either side of the Kerr cell 107 are a polarizing prism 111 and an analyzing prism 112, so placed with reference to each other that light from light 105 will not pass through both of them unless the plane of polarization has been changed by the energization of the electrodes 108. After passing through the prism 112, the light beam is made parallel by a suitable paraboloidal reflector 113 and projected over a desired distance to a plane reflector 114. The beam is then reflected from reflector 114 through an opening in the reflector 100 to a small paraboloidal reflector 115 which distributes the beam over the surface of the reflector 100 to produce parallel rays.

A direct current energy source 116 is connected to the arc light 105 through a current limiting resistor 117, a choke coil 118, and conductors 120 and 121. Alternating current of a frequency desired for modulating the current through the light source 105 may be obtained from an oscillating arc 122, or any suitable form of generating source. The oscillating arc shown is of a form well known in the art and is energized from the energy source 116 through a current limiting resistor 123. Alternating current set up in the oscillatory circuit consisting of condenser 124 and inductor 125 may be used to apply an alternating voltage to the conductors 120 and 121 through the inductive coupling between inductor 125 and an inductor 126. A stopping condenser 127 is inserted between the inductor 126 and the conductor 120 to prevent inductor 126 from short circuiting the direct current source 116.

In the operation of the transmitting system of Fig. 8a, the arc light 105 is continuously excited by a pulsating current formed by the superpositioning of the alternating current from the Poulsen arc 122 on the direct current from the energy source 116. The amplitude of the alternating current in the arc 105 may be adjusted to any desired value by means of the resistor 123, but it is preferable that this amplitude be not large enough to make the current in the arc 105 ever reach a zero value. The light from arc 105 does not pass through the prism 112 unless the electrodes 108 have been energized by the source 109. The radiations projected from the reflector 100 will, therefore, vary in intensity in accordance with the control of the modulating source 110. These radiations will be more uniform than those projected from the system of Fig. 6a, due to the fact that the current through the arc light 105 never reaches a zero value. It is well known, that whenever the current in an arc drops to zero due to the alternations of the exciting source or to the interruptions of these alternations in signalling, the voltage across the arc must rise to a fairly high value before the arc discharge will start. After the arc discharge does start, the voltage may drop to a lower value so that the exciting current may have an irregular wave form which will not give uniform radiations. The present embodiment eliminates this objectionable feature.

Another advantage of the system of Fig. 8a is that the radiation projecting system including the reflectors 100, 114, and 115 may be located at a short distance from the light source 105 and the elements associated therewith. This is desirable in case the reflectors 100 and 101 must be positioned at the tops of masts in order to avoid interference from objects between the transmitting and receiving stations.

The receiving system shown in Fig. 8b may use a local light source 128 of the same general type as the transmitting source 105. The light 128 may be excited in a manner similar to light 105 and with similar elements which have been given like reference characters with prime indicators. In the oscillatory circuit of the arc 122', in addition to an inductor 129 and a variable condenser 130, is a phase shifting system 131 capab'e of changing the phase of the modulations of the light 128. The phase shifting system 131 is of a type well known in the art and comprises a resistor 132, a resistor 133, a variable condenser 134, and two loops 135 and 136. The loops 135 and 136 are positioned with reference to each other so that their effective magnetic fields are at an angle of 90 degrees. Within the combined magnetic fields of the loops 135 and 136 is positioned a loop 137 of suitable turns which may be rotated with reference to loops 135 and 136 and which impresses an alternating voltage on the conductors 120' and 121'. The modulated light waves from the arc light 128 are brought to a parallel beam by condensing lenses 138, then passed through a light filter 140 of the same type as filter 78, and then superimposed on the radiations from reflector 103 by means of a filter-reflector 141 which differs from the filter-reflector 25 of Fig. 4 in that it passes the invisible light from light 105 and reflects the visible light from light 128. The superimposed light beams are reflected from a crystalline plate 142 of quartz, beryl, tourmaline, or the like, capab'e of causing "scattering with change in frequency", onto a light sensitive cell 143. The reflections from the crystalline plate 142 may be coherent or incoherent as desired. The cell 143 is preferably one having a response characteristic similar to curve c in Fig. 2 with high sensitivity to the light of shifted frequency from the plate 142 and low sensitivity to the light passed by the filter 140.

The current variations through the cell 143 are impressed on an autodyne receiver 144 which may be any well known type capable of detecting undamped and unmodulated waves. The receiver 144 comprises direct current energy source 145, input resistor 146, vacuum tubes 147 and 148, plate inductor 149, grid inductor 150, feed-back inductor 151, tuning condenser 152, and by-pass condenser 153. The output terminals of the receiver 144 are connected to a reproducing device 154.

In utilizing the receiving system of Fig. 8b, the values of the resistors 132 and 133 are selected and the variable condenser 134 is adjusted so that the oscillatory currents from the arc 122' through the two loops 135 and 136 are 90 degrees out of phase. It is then possible by rotating the loop 137 with reference to loops 135 and 136 to change the phase of the current modulations in the arc 128 through 360 degrees. This phasing may then be adjusted so that the modulations of the transmitting source 105 and the local source 128 arrive at the reflecting plate 142 in-phase. Since the modulations of the source 105 are not interrupted, the adjustment of the loop 137 can be left fixed when communication has been established. No audible modulations have been specifically provided for in either the transmitting source 105 or the local source 128 so that the receiving circuit 144 is used to make the signals audible in the well known manner.

Figs. 9a and 9b show still another complete light wave communication system in which the transmitting light source is of novel form, the receiver light source and "scattering" medium have temperature control, and both light sources are excited with pulsating currents of a different type from those employed in the system of Figs. 8a and 8b. Fig. 9a is the transmitter and Fig. 9b the receiving equipment. In this system the reflectors 160, 161, 162, and 163 are also similar to reflectors 30, 31, 32, and 33 of Fig. 5. A transmitting light source 165 is of the gas discharge type and comprises a discharge chamber 166 containing suitable electrodes 167. Connected to this chamber is a plurality of radial arms 168 of glass tubing, or similar material that will pass the light waves of the frequency it is desired to use. The arms 168 may be fashioned in a manner to permit all light radiations given off by the arms to arrive at a point 169 in phase. The chamber 166 and the arms 168 contain gas or vapor at a pressure that will allow a glow discharge between the electrodes 167 to extend into the arms 168. This discharge tube is positioned inside of a chamber 170 in such a manner that the point 169 is at the center of a small aperture 171 in one face of the chamber. The chamber 170 is constructed so that a maximum amount of light from the arms 168 passes through the aperture which is positioned at the focus of the reflector 160. A small opaque disk 172 may be so placed that no direct light from between the electrodes 167 passes through the aperture 171. The side elevation of light source 165 is shown in Fig. 10. I believe this specific form of light source is new and particularly adapted to my transmitting system.

The light source 165 is excited in a simple manner with pulsations of a suitable frequency by means of a source of direct current potential 173 acting through conductors 174 and 175, an adjusting resistor 176, and a keying resistor 177. A variable condenser 178 between the conductors 174 and 175 serves to adjust the frequency of the pulsations. Across the resistor 177 are connected a back contact 180 and an arm 181 of a suitable keying relay 182. The relay 182 is operated by a potential source 183 in accordance with the operation of a signalling device 184.

When the signalling device 184 is closed and the contact 180 disconnected from the arm 181, a pulsating current will flow between the electrodes 167 due to the negative voltage-current characteristic of the gas in the chamber 166 and the charging and discharging effect of condenser 178. These pulsations, being explosive in character, will shock excite the light emitting electrons and cause the radiation of wave trains at periodic intervals. The frequency of the pulsations can be controlled by various means, such as by the adjustment of the condenser 178 and resistor 176. When the arm 181 touches contact 180 due to the opening of the signalling device 184, resistor 177 is shorted and the current passing between electrodes 167 increases to a value that will either not permit the occurrence of pulsations or will permit pulsations of a much lower frequency. The radiations emitted by the light source 165 will, therefore, change from an irregular and inefficient type when the signalling device 184 is open to a regular and efficient type when the signalling device 184 is closed.

The local light source in Fig. 9b consists of one or more discharge tubes 185 capable of giving off light of the desired frequency and positioned in such a manner as to uniformly illuminate the vertical walls of a container 186 for a gaseous, liquid, or solid "scattering" medium 187. The container 186 may be arranged to maintain desired pressures on the medium 187 and its walls may be of glass or some material that will readily pass light of the local source frequency and of the shifted frequency. The lights 185 are positioned in a liquid bath 188, the temperature of which is maintained at a value that will result in most efficient "scattering" of the local light waves by means of a temperature control device 189 acting through a circulating coil 190 in the well known manner. The liquid 188 may be a substance or combination of substances that will serve the same purpose as the filter 78. A light filter 191 similar to filter 80 admits only light of the desired frequency from the reflector 163 into the top of the "scattering" medium 187. A spot 192 in the "scattering" medium 187 is focused through a light filter 193 similar to filter 84 onto a light sensitive cell 194 by a suitable lens 195.

The discharge tubes 185 may be connected either in parallel, as shown, or in series, and excited in a manner similar to the light source 165 in Fig. 9a. The circuit elements used for this purpose include conductors 196 and 197, a variable condenser 198, a source of direct current potential 199, an adjusting resistor 200, and a vacuum tube 201. The plate to filament resistance of the vacuum tube 201 may take the place of the resistor 177 in Fig. 9a. In an output lead 202 of the cell 194 is connected an inductor 203 which is suitably coupled to a tuned circuit including inductor 204 and variable condenser 205 and which is connected to an amplifier 206. The amplifier 206 may be of any well known type and may include suitable filter circuits. An output inductor 207 of the amplifier 206 is suitably coupled to an inductor 208 in the input circuit of the tube 201 which includes a variable condenser 209 and a variable resistor 210. The resistor 210 is suitable for adjusting the phase of the voltage impressed on the grid of the vacuum tube 201 to a desired value. A suitable receiver 211 is connected to the cell 194 through conductors 202 and 212. The signals detected by the receiver 211 are understood by means of a reproducing device 213.

In using the system of Fig. 9b, the frequency of the pulsations in the light sources 185 is adjusted by means of condenser 198 and resistor 200 to the desired value, preferably the same as in the transmitting light source 165. The resistor 210 may then be adjusted so that the pulsations in the light waves from the lights 185 arrive at the "scattering" medium 187 in-phase with those from the transmitting source 165. Once this adjustment has been made, the pulsations from the light sources 165 and 185 will be automatically pulled into the desired phase through the action of the inductor 203 on the amplifying system for the vacuum tube 201 in a manner similar to that in Fig. 6b and for the same purpose.

Figs. 11a and 11b show respectively a transmitting and receiving system for still another communication system embodying the principles of the invention and in which light sources of a self oscillatory type are employed. In this system, reflectors 220 and 221 operate in a manner similar to reflectors 30 and 31 of Fig. 5, but may be of a form specifically adapted to the other elements of this system. A transmitting light source 225 positioned at the focus of the reflector 220 is a gas discharge tube of the hot cathode type, the gas pressure of which is suitable for maintaining oscillations in the tube in a manner described hereinafter. Fig. 12 shows an enlarged side elevation of one form of the light source 225. It comprises a spiraled glass tube 226 having on its ends chambers 227 and 228 and containing suitable gas or vapor at the desired pressure. Chamber 227 contains a suitable anode 229 and chamber 228 a suitable cathode 230 which may be heated by a heater coil 231. A connection from anode 229 is made with conductor 232, from cathode 230 with conductor 233, and from heater coil 231 with conductors 234 and 235.

The light source 225 may be energized from a source of direct current potential 236 acting through the conductors 232 and 233, a modulating source 237, and a variable resistor 238. The resistor 238 is employed to vary the current flowing through the discharge tube 225, but may be omitted if suitable voltage control means are provided in the potential source 236. A by-pass condenser 239 may be used to keep oscillatory current out of the potential source 236. The heater coil 231 may be energized by any suitable potential source, such as an alternating current generator 241 acting through the conductors 234 and 235 and a variable resistor 242. The resistor 242 may be of any value suitable for adjusting the temperature of the cathode 230 to the desired value.

It has been found possible with a circuit arrangement such as that shown in Fig. 11a to obtain oscillations within the gas of the discharge tube 225, the frequency of which depend mainly on the pressure of the gas in the tube 225 and the temperature of the cathode 230. This frequency may be independent of the amplitude of the current flowing through the tube. The light radiated from the spiraled tube 226, therefore, varies in accordance with these oscillations in the gas. By varying the amplitude of the current through the tube 225 with the modulating source 237, the light radiations will be modulated in accordance therewith.

A local light source 245 for the receiving system of Fig. 11b is also of the hot cathode type and is detailed in the enlarged section of Fig. 13, in which 246 is a chamber of insulating material containing a cathode 247 and its heater coil 248 with external connections 249, 250, and 251 respectively. Attached to the chamber 246 is a tube 252 also of suitable insulating material, but not necessarily transparent, one end of which is turned back to a ring 253. Attached to the chamber 246 and surrounding the tube 252 is an anode chamber 254 made of filter glass or any suitable material that will readily pass light of the local light frequency. In this chamber is an electrode 255 connected to an external conductor 256, the electrode being so shaped as to permit a uniform gas discharge throughout the chamber 254. The chamber 254 is made in such a form and attached to the chamber 246 in such a manner that gas or vapor can be maintained at a suitable pressure within the chambers 246 and 254 and permit a uniform gas discharge to pass from the cathode 247 through the tube 252 to a point 257 and back through the chamber 254 to the anode 255. Surrounding an end of the chamber 254 is a "scattering" chamber 258 containing a suitable "scattering" medium 259 at a desired pressure and made of filter glass or any material that will readily pass the invisible radiations from source 225 and the shifted light waves used to control a light sensitive cell 260. The light source 245 may be positioned with reference to the reflector 221 so that the maximum amount of radiations from the source 225 strike the surface of the "scattering" chamber 258. The cell 260 may be positioned with reference to the "scattering" chamber 258 so that the maximum number of the shifted light waves may be focused on the cell 260 by a lens 261 through a light filter 262. This specific form of structure for the local light source and "scattering" medium permits efficient utilization of the radiations from the transmitting source 225.

The light source 245 may be energized in a manner similar to source 225 by a direct current potential source 263 acting through the conductors 249 and 256, a resistor 264, and an inductor 265. The heater coil 248 may be energized by a potential source 266 acting through the conductors 250 and 251, and a resistor 267. The cell 260 is connected through conductors 268 and 269 and an inductor 270 to a suitable receiver 271 which actuates a reproducing device 272. Inductor 270 is suitably coupled to an amplifying and phase shifting system similar to that in Fig. 9b comprising inductor 273, condenser 274, amplifier 275, inductors 276 and 277, condenser 278, resistor 279, vacuum tube 280, condenser 281, inductor 282, potential source 283, and by-pass condenser 284.

In the operation of the system of Fig. 11b, the excitation frequency of the light source 245 may be adjusted to the same value as that of the source 225 by the resistor 267 and allowed to oscillate continuously while signals are being sent. The oscillations in source 225 may also be continuous, but in order to make sure that the oscillations in both light sources will continue at the same frequency and with the desired phase relationship the amplifying and phase shifting system coupling inductor 278 with inductor 265 is provided. This system serves the same purpose and functions in the same manner as the corresponding system in Fig. 9b.

Figs. 14a and 14b show respectively a plural channel transmitting and receiving system in accordance with my invention and in which light sources of the electrodeless type are employed. In this system the reflectors 290, 291, 292, and 293 are also similar to reflectors 30, 31, 32, and 33 of Fig. 5. In Fig. 14a, a transmitting light source 295 positioned at the focus of the reflector 290 differs from light sources previously described in other embodiments of my invention in being of the electrodeless type. It is well known that the electric field in a discharge tube employing electrodes varies in intensity from one electrode to another, especially in the vicinity of the cathode. In an electrodeless discharge the field is uniform so that the light radiations are more uniform throughout the entire discharge. While the other forms of light sources described hereinabove may be employed for communication with plural channels, the electrodeless type is particularly well adapted for the purpose, as will be shown hereinafter. A form in which the light source 295 may be used is shown schematically in side elevation in Fig. 15. A tubular ring 296 made of glass, or some other material suitable for passing light of the desired frequency, contains one or more gases at a pressure suitable for permitting an electrodeless discharge of a desired light frequency and intensity when under the influence of an alternating electric field. The intensity of the light radiated from the ring 296 is preferably proportional to the magnitude of the electric field. On the ring 296 may be wound one or more windings 297, 298, and 299 arranged in such a manner that light from the ring 296 may readily pass between turns of the windings. While this form of light source is preferred, other possible forms will be apparent to those skilled in the art.

Referring to Fig. 14a, winding 297 may be energized by a suitable excitation source 300 acting through a transformer 301, a variable condenser 302, and conductors 303 and 304. The energy from the excitation source 300 may be unmodulated and of an audible frequency, if desired. The winding 298 may be energized by an excitation source 305 acting through transformer 306, variable condenser 308, and conductors 303 and 309. Source 305 may be of a different frequency from source 300 and may be modulated by a suitable source 310. In a similar manner, excitation source 311, of a different frequency from sources 300 and 305 and modulated by a source 312, may be used to excite the winding 299 through a transformer 313, variable condenser 314, and conductors 303 and 315.

In the operation of the system of Fig. 14a, excitation source 300 may be used to continuously excite the gas in the tube 296 in any well known manner. This will keep the gas in condition to respond instantly to any variations in the amplitude of the currents from sources 305 and 311. The frequency of the currents from sources 305 and 311 may be high since an electrodeless discharge functions best on very high radio frequencies. The wave radiations given off by the light source 295 will, therefore, vary in intensity in accordance with the combined effect of the unmodulated alternating current from the source 300 and the modulated high frequency currents from the sources 305 and 311.

A local light source 316, shown in section in Fig. 14b, may also be of the electrodeless discharge type and consist of a ring 317 of rectangular cross-section containing one or more suitable gases 318 and surrounded by concentric windings 319, 320, 321, and 322. The ring 317 may be of glass or any material suitable for maintaining a desired pressure on the gases 318 and also for passing light of the desired frequency from the gases 318 into a "scattering" medium 323, such as a suitable liquid or gas, which may be maintained at a definite pressure. A tubular light filter 324 may be used between the ring 317 and the "scattering" medium 323. Radiations from the transmitting source 295 pass from the reflector 293 through a light filter 325 into the medium 323. Light of shifted frequency in a suitable spot 326 in the medium 323 is focused by a lens 327 through a light filter 328 onto a light sensitive cell 329. The cell 329 may be connected through conductors 330 and 331 to a direct current potential source 332, variable condenser 333, variable resistor 334, transformer 335, variable condenser 336, transformer 337, variable condenser 338, and transformer 339. The current variations through the cell 329 are induced through the transformer 335 into an amplifier 341 which in turn excites the windings 319 and 322 through a transformer 342 and a variable condenser 343. The amplifier 341 may contain filters, tuned circuits and other elements needed to select and amplify currents of the same frequency as the excitation source 300. The current variations through the cell 329 are also induced through the transformer 339 into an amplifier 345 which may contain filters, tuned circuits, and other elements suitable for selecting and amplifying the modulated frequency from a source such as 305. By means of a transformer 346 the amplifier 345 excites the winding 321, in parallel with a variable shunting condenser 347, through conductors 348, a variable condenser 350, and the primary of a transformer 352. A suitable receiver 353 with a reproducing device 354 is connected to the secondary of the transformer 352. In a similar manner, transformer 337 is connected to another amplifier 357 which may select and amplify the modulated frequency from the source 311. By means of a transformer 358 the modulated alternating currents of this frequency are used to excite the winding 320, in parallel with a variable condenser 359, through the coupling circuit comprising conductors 360, variable condenser 362, and the primary of a transformer 364. A receiver 365 with its reproducing device 366 is connected to the secondary of the transformer 364.

In the operation of the receiving circuit of Fig. 14b, the gases 318 in tube 317, when excited by windings 319, 320, 321, or 322, transmit light waves into the medium 323 from all sides thus permitting very efficient "scattering" of the light waves. The intensities of the light waves are determined by the combined effects of the windings 319, 320, 321, and 322 so that the amount of light of shifted frequency projected onto the cell 329 depends both on the intensity of the light from the gases 318 and on that from the transmitting source 295. This provides a regenerative effect which permits the utilization of transmitted light waves of relatively low intensities. To obtain this effect it is desirable to keep the gases 318 at least partially excited all the time and this may be accomplished through the unmodulated excitation of source 300 and the amplifier 341. Two windings, 319 and 322, are used with amplifier 341 on account of the lower excitation frequency employed and to keep the gases in the ring 317 uniformly excited. The phase of the current fed by the amplifier 341 into the windings 319 and 322 may be adjusted to a desired value by means of the resistor 334. When light wave modulations from another source, such as source 305, reach the "scattering" medium 323, the amplifier 345 quickly builds up the oscillatory current in the circuit connecting it with the winding 321 due to the regenerative action described above. The amplitude of the oscillatory current in this circuit will increase and diminish in accordance with the variations of the modulating source 310 and these variations will be induced through the transformer 352 into the receiver 353. The phase of the current in the winding 321 may be adjusted by means of the condenser 347, the proper adjustment being indicated in this case by maximum response from the reproducing device 354. When both sources 305 and 311 are used, amplifiers 345 and 357 will each select and amplify only one frequency so that only the signals from modulating source 310 will be obtained in reproducer 354 and only the signals from modulating source 312 will be obtained in reproducer 366. While I have shown only two communication circuits in this embodiment of my invention, it is to be understood that more circuits may be employed, if desired, by the addition of similar elements.

Many modifications of my improved system of communication will be apparent to those skilled in the art and my invention, therefore, is not to be restricted to the specific embodiments chosen for purposes of illustration, but is to be limited only by the scope of the appended claims.

What I claim is:

1. In a detecting system for vibrations of visible and invisible light-frequencies and frequencies adjacent thereto, a local source of vibration, means independent of said vibrations to be detected for scattering with change in frequency at least a portion of said local vibrations, and means for increasing and decreasing said scattered vibrations of changed frequency with said vibrations to be detected.

2. In a detecting system for invisible and inaudible vibrations, a local source of vibrations, scattering means independent of said invisible and inaudible vibrations for shifting the frequency of at least a portion of said local vibrations to at least one frequency in the visible spectrum, and means for increasing and decreasing the intensity of said shifted vibrations with said invisible and inaudible vibrations.

3. In a signalling system, plural means for generating variable intensity light vibrations having different frequencies, and means actuated by the vibrations of one frequency from one of said generating means and also by the vibrations of a second and different frequency from a second of said generating means to produce by scattering with change in frequency light vibrations of a third and different frequency, said light vibrations of said third frequency indicating directly the variation in the vibrations of at least one of said first and said second frequencies.

4. A signalling system in accordance with claim 3 in which said last mentioned means includes a scattering medium for shifting the frequency of a portion of said light vibrations of said first frequency.

5. In a signalling system, an oscillator, a source of light waves energized by said oscillator, a medium upon which said light waves are directed for shifting the frequency of at least a portion of said waves, a second light source, irradiations therefrom being directed on said medium for varying the intensity of said shifted frequencies, said second light source being energized at a certain rate, and means for maintaining said oscillator in a predetermined phase relationship with respect to the energization of said second light source.

6. In a signalling system, a source of variable intensity invisible light waves, a source of light waves lying within a portion of the visible spectrum, a scattering medium for shifting the frequency of at least a portion of said visible light waves, said shifted portion indicating directly the intensity variation of said invisible light waves, and means for directing the light waves from both of said sources on said medium.

7. In a communication system of the class described, a source of wave vibrations lying above $7 \times 10^{11}$ cycles per second, means for modulating said vibrations, a second source of wave vibrations lying above $7 \times 10^{11}$ cycles per second, scattering means independent of said first wave vibrations for shifting at least a portion of said second wave vibrations to wave vibrations of different frequencies than said second wave vibrations, means for varying at least one of said vibrations of shifted frequency directly with said modulations of said first source, and means for detecting said variations in said vibrations of shifted frequency.

8. A communication system in accordance with claim 7 in which said scattering means is a solution of carbon tetrachloride and said detecting means is a photo cell sensitive to said shifted vibrations.

9. The method of detecting invisible vibrations comprising shifting by scattering and independently of said invisible vibrations the frequency of certain other vibrations above the radio spectrum to at least one frequency in the visible spectrum, and modulating said shifted vibrations with said invisible vibrations, said modulations being in phase with the modulations of said invisible vibrations.

10. The method of communication between separated stations comprising projecting light vibrations between said stations, modulating said vibrations at one of said stations, shifting the frequency of local light vibrations by scattering at the receiving station, increasing and decreasing the intensity of said vibrations of shifted frequency with said modulated light vibrations, and detecting the variations in said intensity.

11. The method of signalling from one station to another comprising projecting modulated invisible light waves between stations, generating visible light waves at the receiving station, shifting the frequency of at least a portion of said visible light waves by scattering, varying said light waves of shifted frequency in direct accordance with the modulations of said invisible waves, and detecting the variations in said light waves of shifted frequency.

12. In a signalling system, means for generating high frequency impulses of invisible light waves, means for concentrating said waves at a distant point, and means at said distant point for translating said impulses into impulses of visible waves, said translating means comprising a second source of corresponding light wave impulses, scattering means controlled by said invisible wave impulses for shifting the frequency of at least a portion of said light wave impulses from said second source, and means for detecting the variation in said light wave impulses of shifted frequency.

13. In combination, an oscillator, a light discharge tube, means for actuating said tube with said oscillator, means for modulating said oscillator, a beam projecting device for directing the light waves of said tube to a beam concentrating device, a light scattering medium, a second light source, a second oscillator maintained in synchronism with said first oscillator for actuating said second source, means for directing both of said light waves on said scattering medium, and means focused on said medium for detecting the presence of said first light waves.

14. In combination, a source of inaudible vibrations, means for modulating said vibrations, means for concentrating said vibrations at a distant point, an independent source of vibrations at said distant point, a frequency shifting medium for shifting the frequency of the vibrations of said independent source, means for directing the vibrations of said sources to said medium, means for detecting the presence of said shifted frequencies when varied directly with said inaudible vibrations, and means for interrupting the vibrations of said independent source at an audible rate.

15. In combination, a source of modulated invisible light waves, means for concentrating said waves at a distant point, an independent source of light waves at said distant point, scattering means for changing the frequency of at least a portion of the light waves of said independent source to a frequency in the visible spectrum, means for directing said invisible waves to said scattering means, and means for observing the modulations of said light waves of changed frequency by said invisible waves.

16. In a system for detecting high frequency vibrations of a certain value from a distant point, a local source of high frequency vibrations of a different value, a scattering medium surrounding at least a portion of said source for changing the frequency of at least a portion of said local vibrations, a containing structure for said medium, means for directing said first mentioned vibrations through said structure, and means directed through said structure for detecting intensity variations of said vibrations of changed frequency set up by said first mentioned vibrations.

17. In a signal detecting system, a high frequency vibration source of a certain frequency, a medium for shifting at least a portion of said vibrations to another frequency, means for translating said shifted vibrations into electrical currents, an energy supply for said high frequency vibration source, and means for controlling the energy supplied to said high frequency source by said translated currents.

18. In a signalling system, an oscillator, a source of light waves energized by said oscillator, a medium upon which said light waves are directed for shifting the frequency of at least a portion of said waves, a second light source, irradiations therefrom being directed on said medium for varying the intensity of said shifted frequencies in direct accordance therewith, said second light source being energized at a certain rate, and means for maintaining said oscillator in a predetermined phase relationship with respect to the energization of said second light source.

19. In a signalling system, an oscillator, a source of light waves energized by said oscillator, means for modulating said oscillator, a beam projecting device for directing said light waves to a beam concentrating device, a light scattering medium, means for directing said light waves from said beam concentrating device on said medium, a second oscillator, a second light source energized by said second oscillator, means for directing light waves from said second source on said medium to permit the scattering with change in frequency of at least a portion of said light waves, means for detecting the intensity variations in said scattered light waves set up by said modulating means, and means for adjusting the maximum intensity of said variations, said means comprising frequency and phase adjusting elements for said second oscillator.

20. In a signalling system, a source of variable intensity invisible light waves, a source of light waves lying within a portion of the visible spectrum, a medium scattering for shifting the frequency of at least a portion of said visible light waves, the intensity of said shifted portion indicating directly the intensity variation of said invisible light waves, means for maintaining said medium at a definite pressure, and means for directing the light waves from both of said sources on said medium.

21. In a signalling system, a source of variable intensity invisible light waves, a source of light waves lying within a portion of the visible spectrum, a medium scattering for shifting the frequency of at least a portion of said visible light waves, the intensity of said shifted portion indicating directly the intensity variation of said invisible light waves, means for maintaining said medium at a definite temperature, and means for directing the light waves from both of said sources on said medium.

22. In a signalling system, a source of invisible light waves, a source of light waves lying within a portion of the visible spectrum, a medium for transferring at least a portion of the energy in said invisible waves to said visible waves for increasing the frequency of at least a portion of said visible waves, said increased frequency portion indicating the intensity variation of said invisible light waves, and means for directing the light waves from both of said sources on said medium.

23. The method of synchronizing separated oscillators comprising translating at least a portion of the energy of one of said oscillators into modulated light vibrations of a particular frequency, shifting at least a portion of said modulated light vibrations to modulated light vibrations of a different frequency, translating at least a portion of the energy of a second of said oscillators into modulated light vibrations of a different frequency from said first and said second light vibrations, intensifying said second light vibrations with said third light vibrations, translating the modulations in said second and shifted light vibrations into electrical vibrations and impressing said electrical vibrations on said first oscillator to maintain the frequency of said first modulations the same as the frequency of said third modulations.

24. In a synchronizing system, an oscillator, a source of light waves energized by said oscillator, a medium for shifting the frequency of at least a portion of said waves, a second oscillator of substantially the same frequency as said first oscillator, a source of light waves energized by said second oscillator increasing the intensity of said shifted frequencies, means for translating the variations in said shifted frequencies into electrical currents, and means for impressing said electrical currents on said first oscillator to maintain the oscillations therein at the same frequency as the oscillations in said second oscillator.

25. In a synchronizing system, an oscillator, a source of light waves energized by said oscillator, a medium for shifting the frequency of at least a portion of said waves, a second oscillator of substantially the same frequency as said first oscillator, a source of light waves energized by said second oscillator increasing the intensity of said shifted frequencies, means for translating the variations in said shifted frequencies into electrical currents, means for impressing said electrical currents on said first oscillator to maintain the oscillations therein at the same frequency as the oscillations in said second oscillator, and means for adjusting the phase between said first and said second oscillators.

26. In combination, a light source, means for energizing said source, means for modulating the light waves from said source, means for changing the intensity of the light waves from said source at a frequency different from said modulating means, a beam projecting device for directing the light waves from said source to a beam concentrating device, a light scattering medium, a second light source, means for energizing said second source, means for modulating the light waves from said second source in a manner similar to said first modulating means, means for adjusting the phase between said first modulations and said second modulations, means for directing said light waves from said beam cencentrating device and said second source on said scattering medium, and means focused on said medium for detecting the effect of said intensity changes on said medium.

27. In combination, an oscillator, a light discharge tube, means for actuating said tube with said oscillator, means for modulating said oscillator, a beam projecting device for directing the light waves of said tube to a beam concentrating device, a light scattering medium, means for maintaining said medium at definite physical conditions, a second light source, a second oscillator maintained in synchronism with said first oscillator for actuating said second source, means for directing both of said light waves on said scattering medium, and means focused on said medium for detecting the presence of said first light waves.

28. In combination, an oscillator, a light discharge tube, means for actuating said tube with said oscillator, means for modulating said oscillator, a beam projecting device for directing the light waves of said tube to a beam concentrating device, a light scattering medium, a second light source, a second oscillator maintained in synchronism with said first oscillator for actuating said second source, means for adjusting the phase of said second oscillator with respect to said first oscillator, means for directing the light waves from said beam concentrating device and from said second light source on said scattering medium, and means focused on said medium for detecting the presence of said first light waves.

29. In a signal detecting system, a high frequency vibration source of a certain frequency, an alternating energy supply for said source modulating said vibrations, a medium for shifting at least a portion of said modulated vibrations to another frequency, means for translating said shifted vibrations into alternating electrical currents, means for controlling the energy supplied to said high frequency source by said translated currents, said controlling means including means for adjusting the phase between said translated currents and said alternating energy supply.

30. In a transmission system, a beam projecting device, a light discharge tube having extensions therefrom, means for energizing said tube, means for setting up traveling light pulsations in said extensions, means for interrupting said pulsations, an enclosing structure for said tube, a diaphragm in said structure situated at the focus of said beam projecting device, said tube and said extensions being positioned with respect to said diaphragm to permit the pulsating light waves therefrom to reach said diaphragm substantially in phase.

31. In a communication system, a light discharge tube, a plurality of excitation sources for said tube, means for separately modulating at least one of said sources, a beam projecting device for directing light waves from said tube to a beam concentrating device, a light scattering medium, means for directing said light waves from said concentrating device on said medium, a second light discharge tube, a plurality of excitation sources for said second tube, means for directing light waves from said second tube on said scattering medium, means focused on said medium for detecting the light modulations in said first tube, and means for separating said detected modulations in accordance with said separate modulating means.

32. In a signalling system, a medium for light scattering with shift in frequency, means for focusing invisible light waves on said medium, a local light discharge tube, means for energizing said tube, means for directing visible light waves from said local tube on said medium, and means for detecting the relative intensities of light waves of shifted frequency from said medium, said intensities varying directly in accordance with said focused invisible light waves.

33. In a signalling system, a medium for light scrattering with shift in frequency, means for focusing invisible light waves on said medium, a local light discharge tube, means for energizing said tube, means for directing visible light waves from said local tube on said medium, means for filtering out undesired components of light waves of shifted frequency from said medium, and means for detecting the relative intensities of said filtered waves of shifted frequency, said intensities varying directly in accordance with said focused invisible light waves.

HERMAN POTTS MILLER, Jr.